United States Patent
Fujita et al.

(10) Patent No.: US 11,430,101 B2
(45) Date of Patent: Aug. 30, 2022

(54) UNMANNED AERIAL VEHICLE, INSPECTION METHOD, AND STORAGE MEDIUM

(71) Applicant: ALPINE ELECTRONICS, INC., Tokyo (JP)

(72) Inventors: Kenichiro Fujita, Tokyo (JP); Yosuke Tate, Tokyo (JP)

(73) Assignee: ALPINE ELECTRONICS, INC., Tokyo (JP)

( * ) Notice: Subject to any disclaimer, the term of this patent is extended or adjusted under 35 U.S.C. 154(b) by 0 days.

(21) Appl. No.: 16/860,524

(22) Filed: Apr. 28, 2020

(65) Prior Publication Data

US 2020/0364848 A1 Nov. 19, 2020

(30) Foreign Application Priority Data

May 16, 2019 (JP) .............................. JP2019-092851

(51) Int. Cl.
*G06T 7/00* (2017.01)
*B64C 39/02* (2006.01)
*B64D 47/08* (2006.01)
*H04N 5/232* (2006.01)

(52) U.S. Cl.
CPC .......... *G06T 7/0002* (2013.01); *B64C 39/024* (2013.01); *B64D 47/08* (2013.01); *H04N 5/23299* (2018.08); *B64C 2201/027* (2013.01); *B64C 2201/127* (2013.01); *B64C 2201/14* (2013.01); *G06T 2207/10016* (2013.01); *G06T 2207/10032* (2013.01)

(58) Field of Classification Search
None
See application file for complete search history.

(56) References Cited

U.S. PATENT DOCUMENTS

| 9,753,461 B1* | 9/2017 | Johnson | G01R 31/085 |
| 2015/0304612 A1* | 10/2015 | Richards | H04N 5/33 |
| | | | 348/159 |
| 2020/0354059 A1* | 11/2020 | Newman | B64D 1/18 |
| 2021/0073692 A1* | 3/2021 | Saha | B64F 1/362 |
| 2021/0190847 A1* | 6/2021 | McSchooler | B64C 39/024 |

FOREIGN PATENT DOCUMENTS

| JP | 2006-027448 | | 2/2006 |
| JP | 2006027448 A | * | 2/2006 |

* cited by examiner

*Primary Examiner* — Heather R Jones
(74) *Attorney, Agent, or Firm* — Crowell & Moring LLP (57) ABSTRACT

An unmanned aerial vehicle includes an imaging camera configured to capture the image of an object to be inspected, an object detecting unit configured to detect a relative position of the object to be inspected, a camera angle adjusting unit configured to control the angle of an image capturing direction of the imaging camera on the basis of the relative position detected by the object detecting unit, a determination unit configured to determine whether the image of the object to be inspected is moved out of a video frame of the imaging camera during an image capture operation performed by the imaging camera, and a storage unit configured to store image capture failure information including the result of determination if the determination unit determines that the image of the object is moved out of the video frame.

19 Claims, 9 Drawing Sheets

UNMANNED AERIAL VEHICLE, INSPECTION METHOD, AND STORAGE MEDIUM

RELATED APPLICATION

The present application claims priority to Japanese Patent Application Number 2019-092851, filed May 16, 2019, the entirety of which is hereby incorporated by reference.

BACKGROUND

1. Field of the Invention

The present invention relates to a remote aerial vehicle or an autonomous unmanned aerial vehicle and, more particularly, to a drone having a function of capturing an image of an object to be inspected.

2. Description of the Related Art

For example, to inspect the surface of a power transmission line installed on steel towers, a worker views the surface of the power transmission line by using binoculars or directly views the surface of the power transmission line from a helicopter. Alternatively, a person who has climbed the steel tower crawls along a cable and inspects the cable, or a person inspects the cable by using a cable crawler. If, to inspect such a high-altitude structure, a drone having an aerial photography function moves closer to the structure and captures the image of a portion to be inspected with a camera and if the worker can determine that the captured image has the same quality as the visual image that the eyes observe, the cost required for inspection can be significantly reduced. In addition, autonomous control technology for controlling an unmanned aerial vehicle to fly on a determined flight route at a predetermined speed, automatically return to a takeoff point, and land is currently being developed and is being put to practical use.

Figure 1:
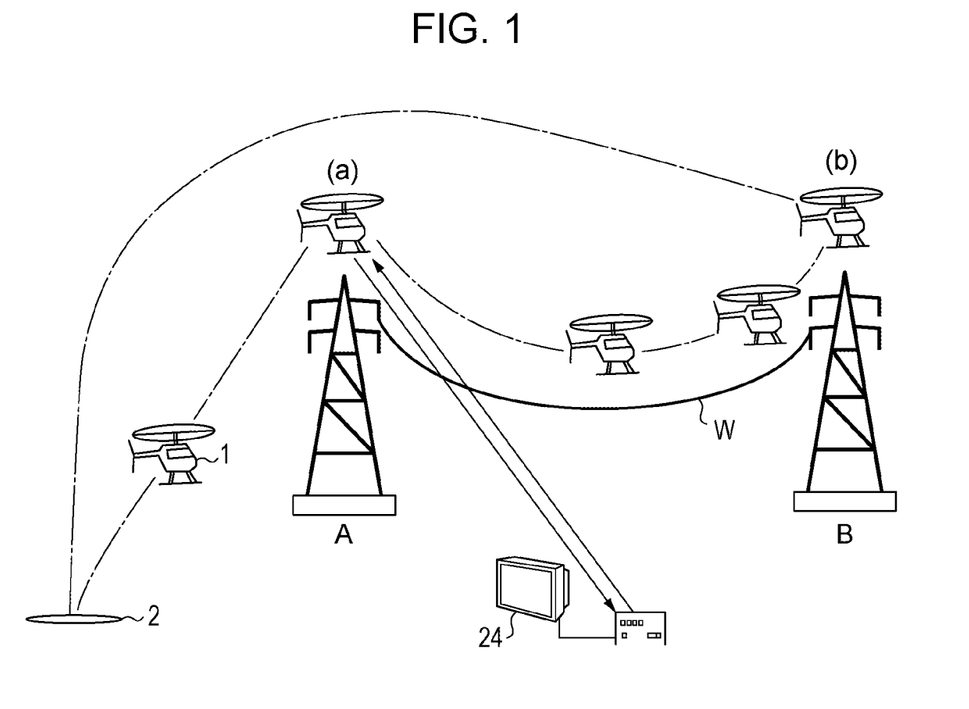

According to an aerial photography method described in Japanese Unexamined Patent Application Publication No. 2006-027448, as illustrated in FIG. 1, an A/C helicopter 1 that flies under autonomous control takes off from an aeronautical station 2 that is a departure point of a preset flight route. Thereafter, the A/C helicopter 1 flies to a point (a) immediately above a steel tower A and flies level to the ground along an overhead power wire W toward a point (b) immediately above a steel tower B. During the time, the A/C helicopter 1 follows the overhead power wire W and continuously captures the image of the overhead power wire W such that the overhead power wire W is located at the center of an image capturing area of the camera. In addition, the A/C helicopter 1 measures the distance to the overhead power line W during the flight and adjusts the zoom factor of the camera in accordance with the measured distance. In this manner, the A/C helicopter 1 can record the high-definition video image of the overhead power wire W that is sufficiently enlarged in the camera frame.

In recent years, an overhead ground wire and power wire inspection system using a small unmanned aerial vehicle, such as a drone, has been developed and has been put in practical use. The drone is equipped with an object detection sensor (for example, LiDAR) that detects the distance and angle relative to an object to be inspected, and the drone autonomously flies so as to maintain a constant positional relationship between its airframe and the object to be inspected on the basis of the detection result of the object detection sensor. In this manner, the drone that follows the object to be inspected is prevented from being in contact with the object to be inspected. In addition, the drone is equipped with a camera that captures the image of the object to be inspected via a gimbal. The gimbal functions as an actuator that can fine-tune the direction of the camera in three dimensions. The gimbal controls the angle of the camera by using the detection result of the object detection sensor so that the camera captures the image in the vertical direction of the drone at all times even when the attitude of the drone changes. As a result, the image capture operation is controlled such that the image of the object to be inspected is located at the center of the camera frame.

Figure 2A:
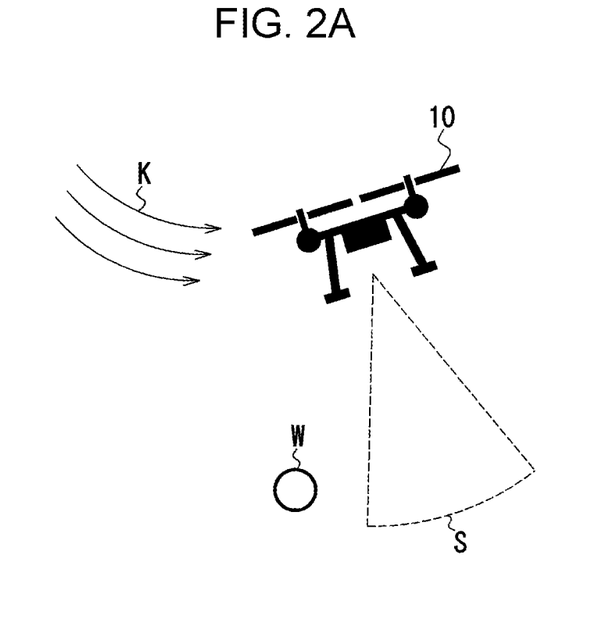
FIG. 2A is a schematic illustration of an airframe and an overhead power wire viewed from the side.

When the drone performs an image capture operation for inspection, the attitude and position of the airframe may change suddenly due to a factor such as strong wind. At this time, the gimbal operates to absorb a change in the attitude of the airframe. FIG. 2A is a schematic illustration of an airframe 10 and an overhead power wire W viewed from the side. If a wind K blows from the side when the airframe 10 is flying immediately above the overhead power wire W, the airframe 10 yaws toward the direction of the wind so as to attempt to maintain the flight position immediately above the overhead power wire W. At this time, the gimbal controls the angle of the camera so that the overhead power wire W is located within an image capturing range S.

Figure 2B:
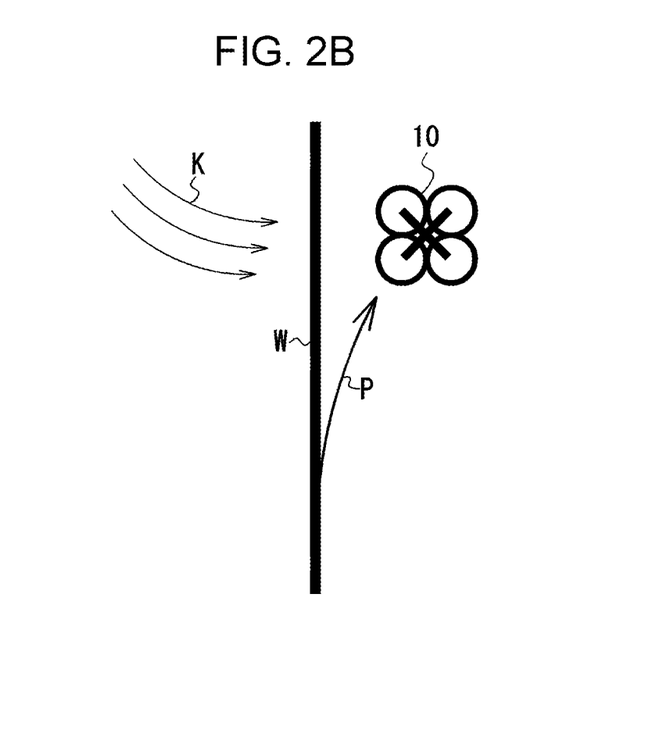
Figure 3:
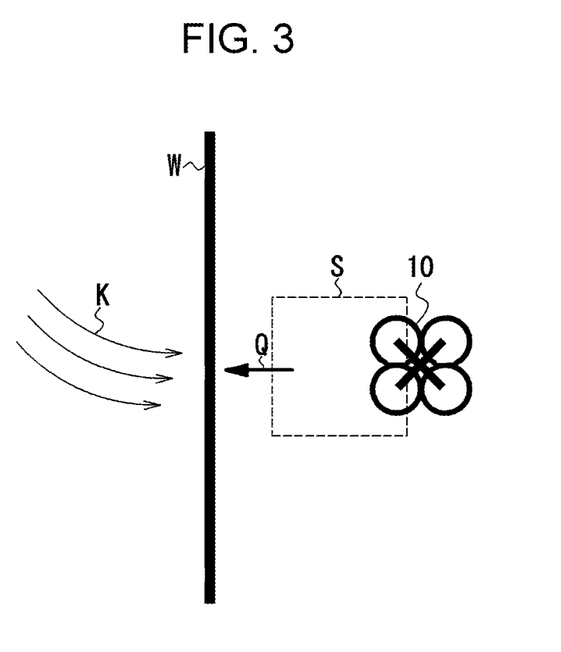
FIG. 3 is a diagram illustrating an example in which the image of an object to be inspected moves out of a frame in aerial photography using an existing unmanned aerial vehicle.

FIG. 2B is a schematic illustration of the airframe 10 and the overhead power wire W viewed from above. If, for example, the wind K blows, the airframe 10 may yaw in a lateral direction P so as to move away from the overhead power wire W. Even in this case, flight control is performed so that the airframe 10 is heading in a direction Q of the overhead power wire W, and the gimbal controls the angle of the camera so as to reduce the influence. However, if the rapid change in attitude of the drone cannot be completely absorbed in the end, the overhead power wire W moves out of the image capturing range S, as illustrated in FIG. 3. As used herein, this phenomenon is referred to as "frameout". It is difficult to determine whether frameout of the overhead power wire W has occurred before the video data captured with the camera is played back and is visually checked after return of the drone. For this reason, it is necessary to play back and check the captured video data on site, and such work is significantly troublesome.

SUMMARY

Accordingly, it is an object of the present disclosure to provide an unmanned aerial vehicle, an inspection method, and a storage medium capable of solving the above-described existing problems and easily determining whether a re-image capture operation of an object to be inspected is required.

According to the present disclosure, an unmanned aerial vehicle includes an image capturing unit configured to capture an image of an object, a detection unit configured to detect a relative position of the object, an angle control unit configured to control an angle of an image capturing direction of the image capturing unit on a basis of the relative position detected by the detection unit, a determination unit configured to determine whether the object is moved out of an image capturing range of the image capturing unit during an image capture operation performed by the image capturing unit, and a storage unit configured to store image capture failure information including the result of determination if the determination unit determines that the object is moved out of the image capturing range.

According to one aspect of the present disclosure, the determination unit determines whether the object is moved out of the image capturing range on the basis of the image capturing direction of the image capturing unit and the relative position detected by the detection unit. According to one aspect of the present disclosure, the image capturing direction of the image capturing unit is determined by an angle of view of an imaging camera of the image capturing unit and the angle controlled by the angle control unit. According to one aspect of the present disclosure, the determination unit determines whether the object is out of the image capturing range for a predetermined period of time or longer. According to one aspect of the present disclosure, if the image capturing unit generates n video frames per second, the determination unit determines whether the image of the object is moved out of m or more video frames, where m is a natural number less than n. According to one aspect of the present disclosure, the determination unit determines whether the image of the object is moved out of a predetermined area of a video frame. According to one aspect of the present disclosure, the unmanned aerial vehicle further includes a flight control unit configured to control the flight of the unmanned aerial vehicle such that the unmanned aerial vehicle follows the object on the basis of the relative position detected by the detection unit. According to one aspect of the present disclosure, the unmanned aerial vehicle further includes an output unit configured to output the image capture failure information stored in the storage unit. According to one aspect of the present disclosure, if the image capture failure information is stored, the flight control unit controls the flight such that the image of the object is re-captured on the basis of the image capture failure information. According to one aspect of the present disclosure, if the image capture failure information is stored, the flight control unit stops the flight. According to one aspect of the present disclosure, the detection unit emits a laser beam to the object and measures a reflected beam so as to measure a distance and an angle to the object.

According to the present disclosure, a method for inspecting an object by use of an unmanned aerial vehicle is provided. The unmanned aerial vehicle includes an imaging camera and a sensor that detects a relative position of the object. The method includes the step of determining whether the imaging camera captures the image of the object from the relative position of the object detected by the sensor and an angle of view of the imaging camera during image capture of the object by the imaging camera and the step of storing image capture failure information including the result of determination if it is determined that the imaging camera does not capture the image of the object.

According to one aspect of the present disclosure, the method further includes the step of outputting the image capture failure information. According to one aspect, the method further includes the step of controlling the flight such that the image of the object at a location at which the image capture failed is re-captured on a basis of the image capture failure information. According to one aspect, the method further includes the step of stopping the flight if the image capture failure information is stored. According to one aspect, in the step of determining whether the imaging camera captures the image of the object, if the unmanned aerial vehicle has an imaging camera angle adjustment mechanism mounted therein, it is determined whether the imaging camera captures the image of the object on a basis of an angle adjusted by the angle adjustment mechanism, an angle of view of the imaging camera, and the relative position of the object detected by the sensor.

According to the present disclosure, a non-transitory computer readable storage medium storing program code is provided. When executed by a processor of an unmanned aerial vehicle that inspects an object and that includes an imaging camera and a sensor for detecting a relative position of the object, the program code causes the processor to perform the step of determining whether the imaging camera captures the image of the object from the relative position of the object detected by the sensor and an angle of view of the imaging camera during image capture of the object by the imaging camera and the step of storing image capture failure information including the result of determination if it is determined that the imaging camera does not capture the image of the object.

According to the present disclosure, during image capture of an object, it is determined whether the object moves out of an image capturing range. If the object moves out of the image capturing range, the result of determination is stored. As a result, a user can detect whether re-capture of the image is necessary without playing back and checking the captured video of the object.

BRIEF DESCRIPTION OF THE DRAWINGS

FIG. 1 is a diagram illustrating an example of an existing unmanned aerial vehicle to capture aerial photography of an overhead power wire or the like;

FIG. 2B is a schematic illustration of the airframe and the overhead power wire viewed from above, which illustrates how the attitude of the airframe changes due to wind or the like;

DETAILED DESCRIPTION OF THE PREFERRED EMBODIMENTS

Exemplary embodiments of the present invention are described below with reference to the following example. That is, an unmanned aerial vehicle according to the present embodiment is used to inspect a power transmission line installed between steel towers, a natural disaster site, such as landslides, or the like, which is difficult for humans to visually inspect. Note that the configuration of the unmanned aerial vehicle is not limited to a particular configuration. For example, the unmanned aerial vehicle may be a drone, a helicopter, or an airship.

Embodiments

According to an embodiment described below, a description is given with reference to an example in which an overhead power wire is inspected by using an unmanned aerial vehicle. The unmanned aerial vehicle (a drone) according to the present embodiment has an airframe main body equipped with an imaging camera for capturing the image of an overhead power wire to be inspected. The imaging camera is attached to the airframe main body via an angle adjustable actuator, such as a gimbal. The angle adjustable actuator can control the angle of the imaging camera having three degrees of freedom of, for example, the X-axis, the Y-axis, and the Z-axis. For example, as illustrated in FIG. 1, the unmanned aerial vehicle captures the image of an overhead power wire W installed between steel towers from above (in the vertical direction), and the captured video data is provided for inspection of the overhead power wire W.

Figure 4:
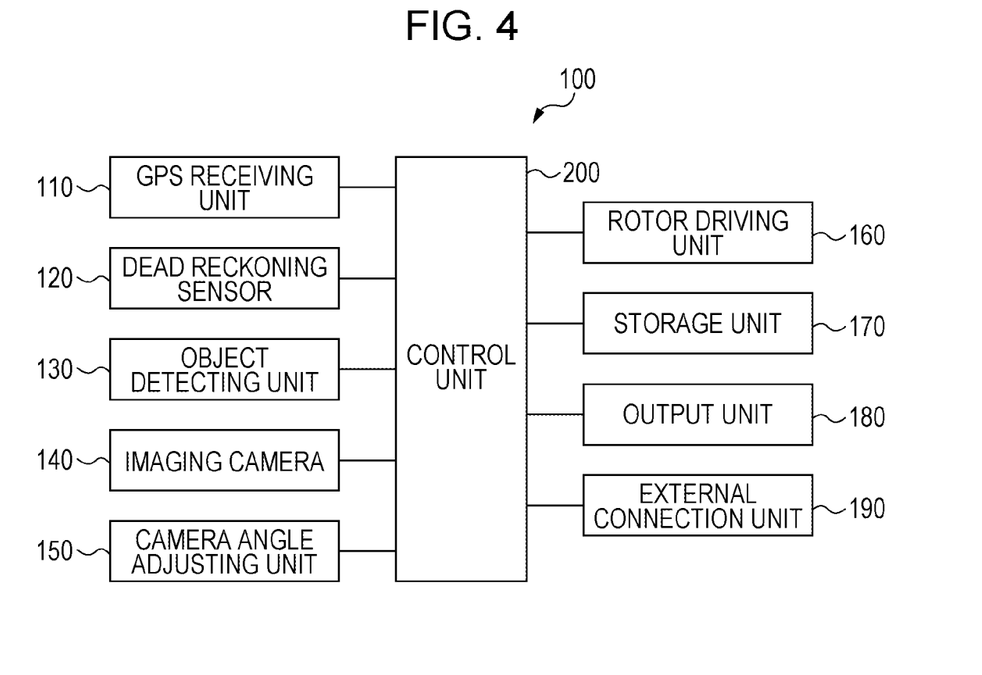
FIG. 4 is a block diagram illustrating the electrical configuration of an unmanned aerial vehicle according to the present invention.

FIG. 4 is a block diagram illustrating the electrical configuration of the unmanned aerial vehicle according to the present embodiment. An unmanned aerial vehicle 100 according to the present embodiment includes a GPS receiving unit 110, a dead reckoning sensor 120, an object detecting unit 130, an imaging camera 140, a camera angle adjusting unit 150, a rotor driving unit 160, a storage unit 170, an output unit 180, an external connection unit 190, and a control unit 200. Note that the above configuration is only an example and is not necessarily limited thereto.

The GPS receiving unit 110 receives a GPS signal emitted from a GPS satellite and detects an absolute position of the unmanned aerial vehicle 100 (including the latitude and longitude of the unmanned aerial vehicle 100). The unmanned aerial vehicle 100 can fly autonomously in accordance with flight information provided in advance. As illustrated in FIG. 1, examples of the flight information include a flight route (including the latitude and longitude position information) from the aeronautical station 2, which is a departure point, to the aeronautical station 2, which is a return point, via the point (a) indicative of the steel tower A and the point (b) indicative of the steel tower B, a flight speed, and a flight altitude. The unmanned aerial vehicle 100 flies so as to follow the flight route by using the position information detected by the GPS receiving unit 110.

The dead reckoning sensor 120 includes sensors required for the unmanned aerial vehicle 100 to perform dead reckoning navigation (for example, a direction sensor and an altitude sensor). The output of the dead reckoning sensor 120 is used for flight control during autonomous flight in accordance with the flight information.

The object detecting unit 130 detects a relative distance and a relative angle to the object to be inspected. The object detecting unit 130 is configured using, for example, LiDAR (Laser Imaging Detection and Ranging). A LiDAR instrument emits a pulsed laser beam in a 360-degree direction and measures a reflected beam corresponding to the laser emission. In this manner, a LiDAR instrument detects the distance and the angle relative to an object. According to the present embodiment, the distance and the angle between the unmanned aerial vehicle 100 and the overhead power wire W are detected. Note that the object detecting unit 130 is not limited to a LiDAR instrument. For example, a device that detects a distance and an angle relative to an object using a plurality of stereo cameras may be used as the object detecting unit 130. The unmanned aerial vehicle 100 follows the overhead power wire W on the basis of the detection result of the object detecting unit 130 so as to maintain a certain distance and a certain angle with respect to the overhead power wire W to be inspected.

As described above, the imaging camera 140 is attached to a lower part of the airframe main body via the angle adjustable actuator. The imaging camera 140 captures a video of the overhead power wire W to be inspected and generates, for example, 24 video frames (still images) per second. In addition, the imaging camera 140 has a zoom function, and its magnification factor is adjusted such that an overhead power wire W of a certain size is imaged in each of the video frames.

The camera angle adjusting unit 150 drives the angle adjustable actuator in response to an angle adjustment signal received from the control unit 200 and adjusts the angle of the imaging camera 140. The control unit 200 calculates the angle such that the image capturing direction of the imaging camera 140 (the direction of the optical axis of the lens of the imaging camera) is the vertical direction on the basis of the detection results of the dead reckoning sensor 120 and the object detecting unit 130. Thereafter, the control unit 200 generates an angle adjustment signal on the basis of the result of calculation.

The rotor driving unit 160 rotates a rotor connected to, for example, a propeller or the like on the basis of a drive signal received from the control unit 200. The control unit 200 generates a drive signal for the unmanned aerial vehicle 100 to fly autonomously along the flight route on the basis of the information detected by the GPS receiving unit 110, the dead reckoning sensor 120, the object detecting unit 130 and the flight information.

The storage unit 170 stores various kinds of information necessary for operating the unmanned aerial vehicle 100. The storage unit 170 stores, for example, the flight information provided in advance, stores programs and software to be executed by the control unit 200, and stores video data regarding the object to be inspected, which is captured by the imaging camera 140. Furthermore, according to the present embodiment, the storage unit 170 stores image capture failure information indicating that the imaging camera 140 has failed to capture the image of the object to be inspected. The image capture failure information can inform the user that re-capture of the image of the object to be inspected is required, so that the user need not play back the video data captured by the imaging camera 140.

The output unit 180 reads the information stored in the storage unit 170 and outputs the information to the outside. Note that the configuration of the output unit 180 is not limited to a particular configuration. For example, the output unit 180 can include a display unit that displays video data stored in the storage unit 170. Alternatively, the output unit 180 can output the information read from the storage unit 170 to an external device connected via the external connection unit 190 by wire or wirelessly.

The external connection unit 190 enables the unmanned aerial vehicle 100 to be connected to an external device by wire or wirelessly. The external device is, for example, a computer device. The external device can control the unmanned aerial vehicle 100 via the external connection unit 190. For example, the external device can write the flight information provided in advance into the storage unit 170, read, from the storage unit 170, the video data obtained by capturing the image of the object to be inspected, and provide an instruction from the user to the control unit 200.

The control unit 200 controls each of the units of the unmanned aerial vehicle 100. In one aspect, the control unit 200 includes, for example, a microcontroller, a microprocessor, or an image processing processor including a read-only memory (ROM)/random access memory (RAM). The control unit 200 executes programs and software stored in the storage unit 170 or the ROM/RAM to control the unmanned aerial vehicle 100. In this manner, the control unit 200 controls the unmanned aerial vehicle 100 to fly autonomously and capture the image of an object to be inspected.

An autonomous flight control program is used to control the unmanned aerial vehicle 100 to fly along a flight route provided in advance on the basis of the absolute position (the latitude, longitude, and altitude) detected by the GPS receiving unit 110, the azimuth and altitude detected by the dead reckoning sensor 120, and the like. The flight route is a route generally along the overhead power wire W. Furthermore, the autonomous flight control program is used to control the unmanned aerial vehicle 100 to fly so as to follow the overhead power wire W while maintaining a certain distance from the overhead power wire W on the basis of the relative distance and angle of the overhead power wire W detected by the object detecting unit 130.

Figure 5:
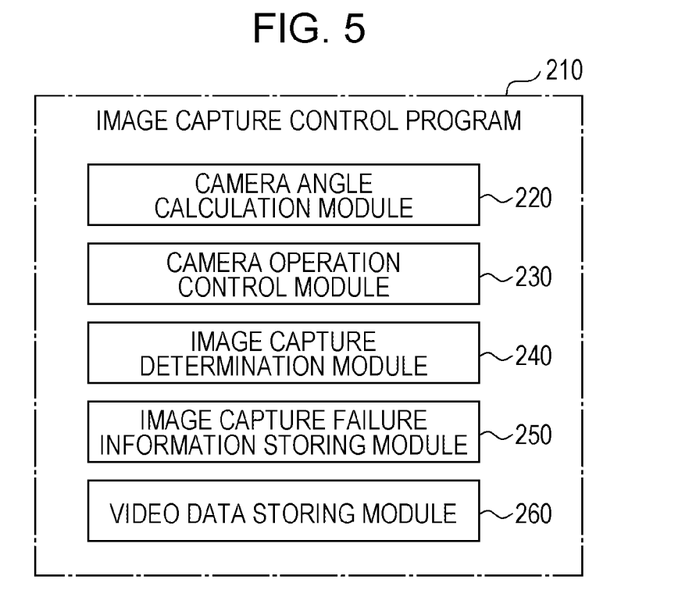
FIG. 5 is a block diagram illustrating the functional configuration of an image capture control program according to an embodiment of the present invention.

While the unmanned aerial vehicle 100 is continuously flying along the overhead power wire W, an image capture control program controls the imaging camera 140 so that the image of the overhead power wire W is captured. In addition, the image capture control program stores the video data captured by the imaging camera 140 in the storage unit 170. FIG. 5 illustrates a detailed configuration of the image capture control program according to the present embodiment. As illustrated in FIG. 5, an image capture control program 210 includes a camera angle calculation module 220, a camera operation control module 230, an image capture determination module 240, an image capture failure information storing module 250, and a video data storing module 260.

The camera angle calculation module 220 calculates the angle of the image capturing direction of the imaging camera 140 on the basis of the detection result received from the object detecting unit 130 such that the image of the overhead power wire W is located inside of a video frame of the imaging camera 140. After calculating the angle of the image capturing direction, the camera angle calculation module 220 provides an angle adjustment signal representing the result of calculation to the camera angle adjusting unit 150. The camera angle adjusting unit 150 drives the angle adjustable actuator on the basis of the angle adjustment signal to adjust the image capturing direction of the imaging camera 140. According to the present embodiment, the camera angle calculation module 220 calculates the angle so that the image capturing direction (the direction of the optical axis) of the imaging camera 140 is the vertical direction. Thus, the imaging camera 140 captures the aerial image of the overhead power wire W from immediately above.

Figure 6A:
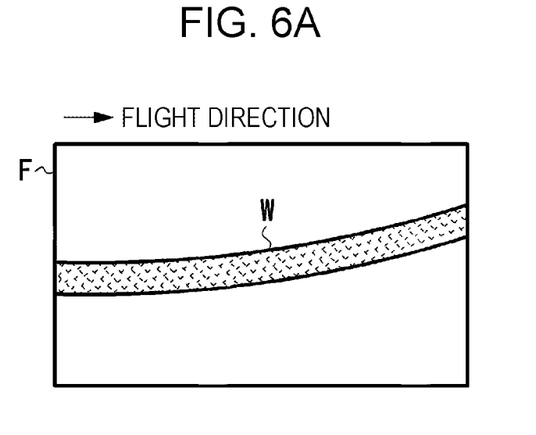
FIGS. 6A and 6B are diagrams illustrating a relationship between a video frame and an overhead power wire subjected to image capture.

The zoom of the imaging camera 140 is set to a preselected magnification factor, and the flight is controlled in accordance with the autonomous flight control program so that the relative distance between the unmanned aerial vehicle 100 and the overhead power wire W is constant. The range of the real space (the lengths of the real space in the vertical direction and the horizontal direction) whose image is captured in the video frame of the imaging camera 140 is determined by these settings. That is, the size of the image of the overhead power wire W located inside of the video frame is determined. As illustrated in FIG. 6A, it is desirable that the size of the image of the overhead power wire W in a video frame F be a size that enables the user to inspect the overhead power wire W.

Figure 6B:
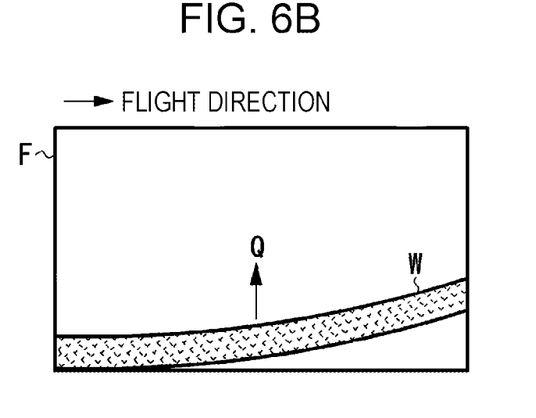

In FIG. 6A, if the longitudinal direction of the video frame F is substantially parallel to the flight direction, the camera angle calculation module 220 calculates the angle of the imaging camera 140 on the basis of the relative angle of the overhead power wire W detected by the object detecting unit 130 such that the captured image of the overhead power wire W is located at the substantial center of the video frame F. In addition, if, as illustrated in FIG. 2A, the unmanned aerial vehicle 100 is influenced by the wind and, thus, the attitude of the airframe changes or if, as illustrated in FIG. 2B, the unmanned aerial vehicle 100 moves away from the overhead power wire W, the captured image of the overhead power wire W in the video frame F is shifted from the center portion to the edge portion of the video frame F, as illustrated in FIG. 6B. In this case, the camera angle calculation module 220 calculates the angle of the imaging camera 140 on the basis of the change amount of the relative angle of the overhead power wire W detected by the object detecting unit 130 such that the image of the overhead power wire W moves in a direction Q toward the center portion.

The camera operation control module 230 controls, for example, the start and end of the image capture operation performed by the imaging camera 140. More specifically, if the unmanned aerial vehicle 100 starts flying along the flight route, moves closer to the overhead power line W, and reaches the image capture start point, the camera operation control module 230 causes the imaging camera 140 to start the image capture operation. Thereafter, if the unmanned aerial vehicle 100 flies along the overhead power wire W in accordance with the flight route and reaches the image capture end point, the camera operation control module 230 causes the imaging camera 140 to end the image capture operation. In addition to the above-described control operation, the camera operation control module 230 can control the image capture conditions of the imaging camera 140 (for example, the magnification factor).

Figure 7A:
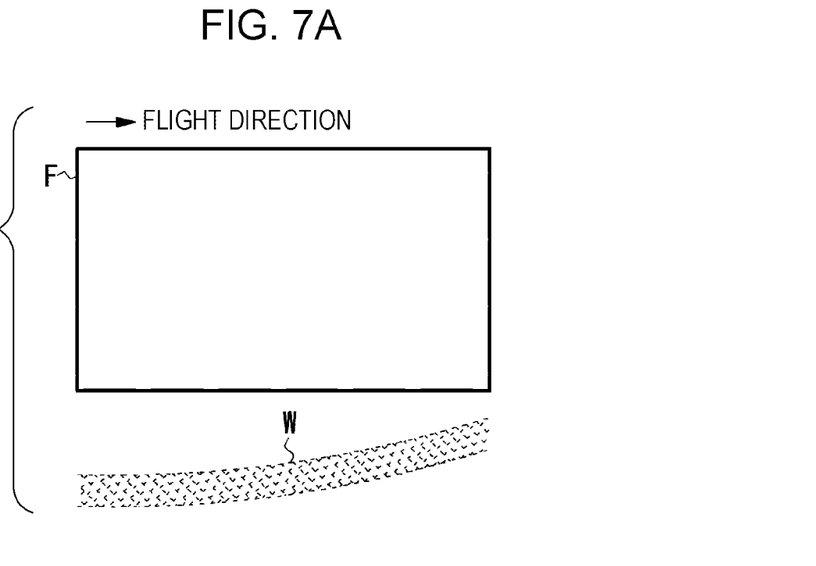
FIGS. 7A and 7B are diagrams for explaining the definition of the term "frameout" according to the embodiment of the present invention.

The image capture determination module 240 determines whether the image of the overhead power wire W is properly captured into a video frame of the imaging camera 140 during a period during which the imaging camera 140 captures the image of the overhead power wire W. If, during the image capture operation, the attitude of the unmanned aerial vehicle 100 suddenly changes due to the influence of a strong wind or the like (refer to FIG. 2A) or temporarily deviates from the flight route (refer to FIG. 2B), it may be difficult for the angle adjustable actuator to immediately control the angle. In this case, frameout of the overhead power wire W from the video frame F may occur, as illustrated in FIG. 7A. The image capture determination module 240 determines whether frameout of the overhead power wire W has occurred on the basis of the relative position of the overhead power wire W detected by the object detecting unit 130, the current controlled angle of the angle adjustable actuator, and the angle of view set for the imaging camera 140.

Figure 8:
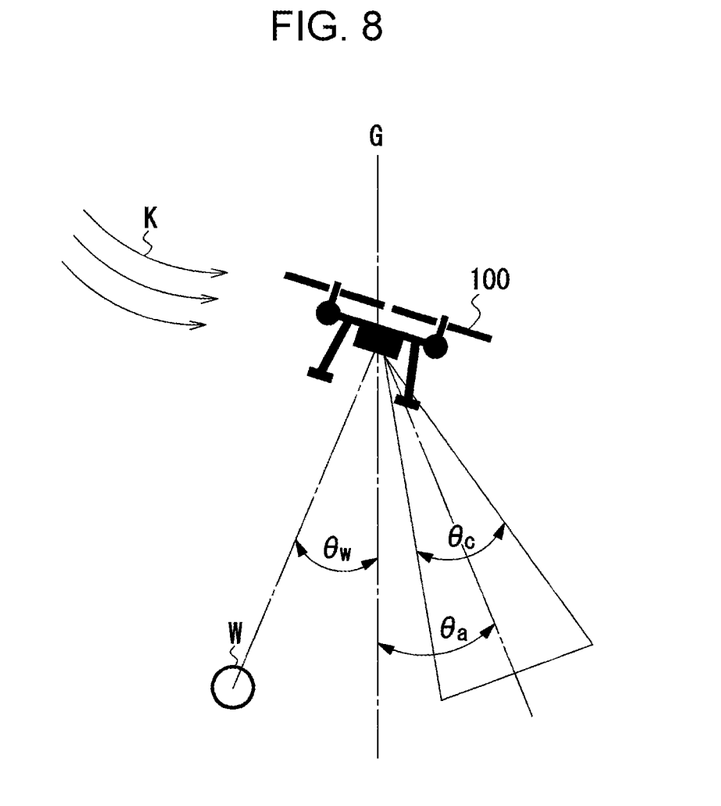
FIG. 8 is a diagram illustrating an example of a determination method for use of an image capture determination module according to the embodiment of the present invention.

FIG. 8 is a diagram illustrating a determination method for use of the image capture determination module 240. In FIG. 8, the flight direction of the unmanned aerial vehicle 100 is substantially parallel to the direction in which the overhead power wire W extends. At this time, the object detecting unit 130 detects a relative angle θw of the overhead power wire W with respect to a reference line G extending in the vertical direction of the unmanned aerial vehicle 100. In addition, the angle of view θc of the imaging camera 140 is a known value determined from the zoom magnification factor, and the angle of view θc defines the size of the video frame F illustrated in FIG. 7A. If the current angle of the angle adjustable actuator with respect to the reference line G is θa (the direction defined by the angle θa is the same as the direction of the optical axis of the imaging lens of the imaging camera 140), the angle of view θc indicates that the image is captured in the direction of the angle offset by the angle θa. The image capture determination module 240 determines whether the angle θw of the overhead power wire W is included in the imaging range defined by the angle of view θc offset by the angle θa. If the difference between the two is equal to or greater than a predetermined value, the image capture determination module 240 determines that the image of the overhead power wire W is not captured, that is, determines that frameout of the overhead power wire W from the video frame F has occurred.

Figure 7B:
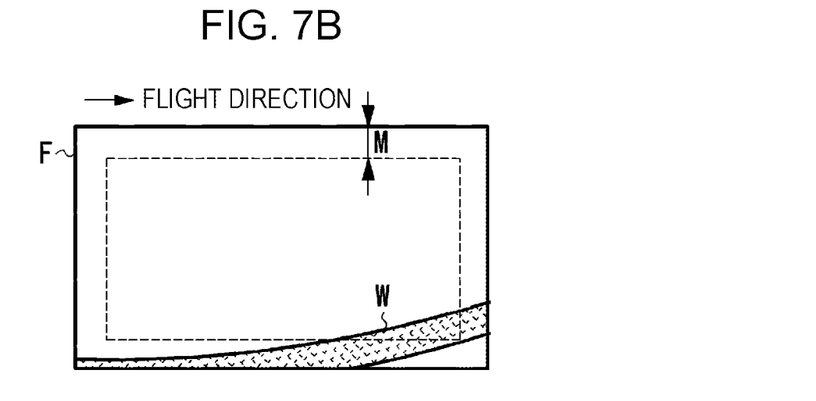

Furthermore, if the image of the overhead power wire W is captured so as to be located on the outer edge of the video frame F, part of the image of the overhead power wire W may be lost, or the image may be unclear due to optical distortion. For this reason, as illustrated in FIG. 7B, a predetermined margin M may be provided around the outer periphery of the video frame F, and it may be determined whether the image of the overhead power wire W is captured so as to be located inside the margin M. In this case, an angle of view θc' (θc'<θc) that defines the margin M is set and used.

Still furthermore, the imaging camera 140 generates a plurality of video frames per second (for example, 24 video frames per second). Accordingly, if frameout of the overhead power wire W occurs for a significantly short time, the lost image of the overhead power wire W for the frameout period can be generated through interpolation using the previous and next video frames. For this reason, if frameout of the overhead power wire W occurs for a certain period of time, the image capture determination module 240 determines that the image of the overhead power wire W is not properly captured. For example, in the case where 24 video frames are generated in one second, if frameout occurs in each of 12 out of 24 video frames, the image capture determination module 240 determines that the image of the overhead power wire W is not properly captured.

If the image capture determination module 240 determines that the image of the overhead power wire W is not properly captured, the image capture failure information storing module 250 stores, in the storage unit 170, image capture failure information indicating that a failure has occurred in capturing the image of the overhead power wire W during the image capture operation. The image capture failure information can further include a location at which the image capture failed and the time when the image capture failed. The location at which the image capture failed includes the position information (the latitude and longitude) detected by the GPS receiving unit 110, and the time when the image capture failed includes the time at which frameout occurred and the period of time during which the frameout continued on the basis of the image capture start time. When the image capture failure information is stored, the output unit 180 can output information indicating that the image capture failure information is stored. For example, the user may be notified by emission of light from an LED that image capture failure information is stored.

The video data storing module 260 stores, in the storage unit 170, the video data captured during the operation performed by the imaging camera 140.

The image capture operation performed by the unmanned aerial vehicle 100 that captures the image of an object to be inspected according to the present embodiment is described below with reference to the flowchart illustrated in FIG. 9. An external computer device is connected via the external connection unit 190 first. Subsequently, flight information including a flight route is input to the unmanned aerial vehicle 100 from the computer device (S100). The flight information is stored in the storage unit 170 or the RAM of the control unit 200. The autonomous flight control program of the control unit 200 starts the autonomous flight of the unmanned aerial vehicle to inspect the overhead power line W in accordance with the input flight information (S110).

The unmanned aerial vehicle 100 autonomously flies along the overhead power wire W while maintaining a certain distance from the overhead power wire W on the basis of the relative distance and angle to the overhead power wire W detected by the object detecting unit 130. During the flight, the image of the overhead power wire W is captured. That is, when the unmanned aerial vehicle 100 reaches the image capture start position for the overhead power wire W, the camera operation control module 230 activates the imaging camera 140 and starts capturing the image of the overhead power wire W (S120).

During the image capture period, the camera angle calculation module 220 calculates the angle of the image capturing direction of the imaging camera 140 on the basis of the distance and angle to the overhead power wire W detected by the object detecting unit 130 and outputs an angle adjustment signal to the angle adjustable actuator on the basis of the result of calculation. The angle adjustable actuator controls the angle of the imaging camera 140 (S130). In addition, during the image capture period, the video data regarding the overhead power wire W captured by the imaging camera 140 are sequentially stored in the storage unit 170 by the video data storing module 260 (S140). Furthermore, the image capture determination module 240 determines whether frameout of the overhead power wire W from the video frame F has occurred (S150). If the image capture determination module 240 determines that frameout has occurred, the image capture failure information storing module 250 stores, in the storage unit 170, image capture failure information indicating that the image capture operation has failed (S160).

During the image capture period, the processes in steps S130 to S160 are repeated. According to the autonomous flight control program, if the unmanned aerial vehicle 100 reaches the image capture end point of the flight route for the object to be inspected, the camera operation control module 230 stops the image capture operation performed by the imaging camera 140 (S170), and the unmanned aerial vehicle 100 returns to the start point (S180).

Thereafter, the user checks whether the image capture failure information is stored in the storage unit 170 of the unmanned aerial vehicle 100. Thus, the user can get to know whether there was an event that prevented capture of the image of the overhead power wire W while the image of the overhead power wire W was being captured. In addition, the output unit 180 may switch on, for example, a lamp or the like so that the user easily get to know that the image capture failure information is stored. Unlike an existing technique, this technique eliminates the need for the user to play back video data captured by the imaging camera 140 and check, from the played back video, the occurrence of frameout. As a result, the user can immediately determine whether re-capture of the image of the overhead power wire W, which is an object to be inspected, is needed.

In addition, since the image capture failure information includes the location information at which an image capture operation has failed, the user can generate a flight route including a place where the image is to be captured again and, thus, cause the unmanned aerial vehicle 100 to capture only the video frames corresponding to an image capture failure zone where frameout has occurred. In this manner, the efficiency of image capture of the object to be inspected can be improved.

Figure 10:
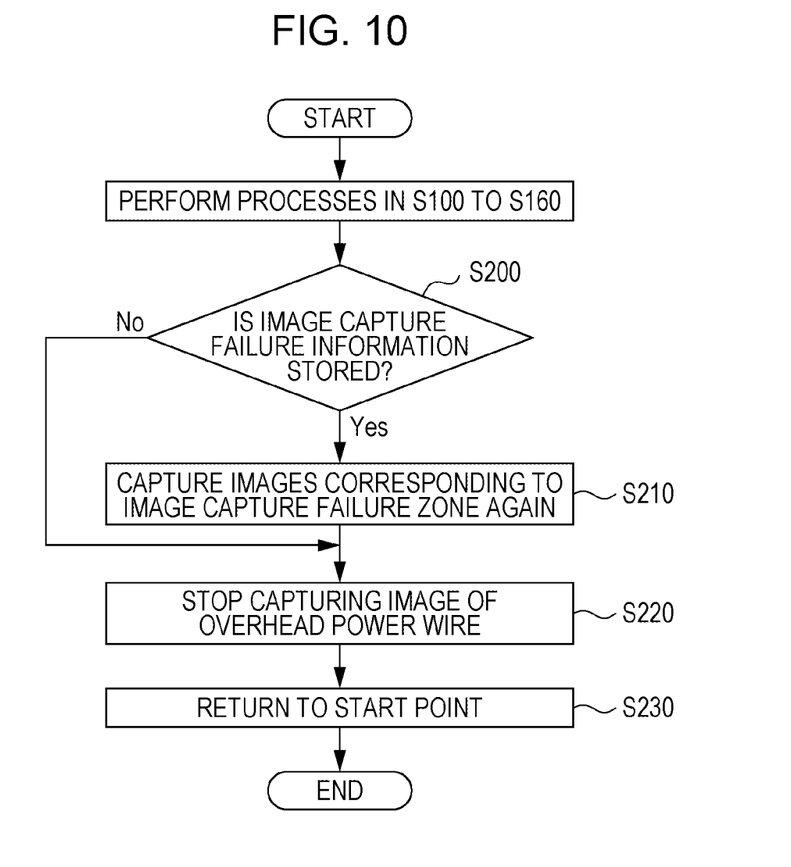
FIG. 10 is a flowchart for describing the operation for controlling image capture of an object to be inspected according to a second embodiment of the present invention.

A second embodiment of the present invention is described below. According to the second embodiment, if the image capture determination module 240 determines that frameout of the overhead power wire W has occurred, the autonomous flight control program can automatically perform re-capture of the images corresponding to the image capture failure zone on the basis of the result of determination. FIG. 10 illustrates the operation flow according to the second embodiment.

Figure 9:
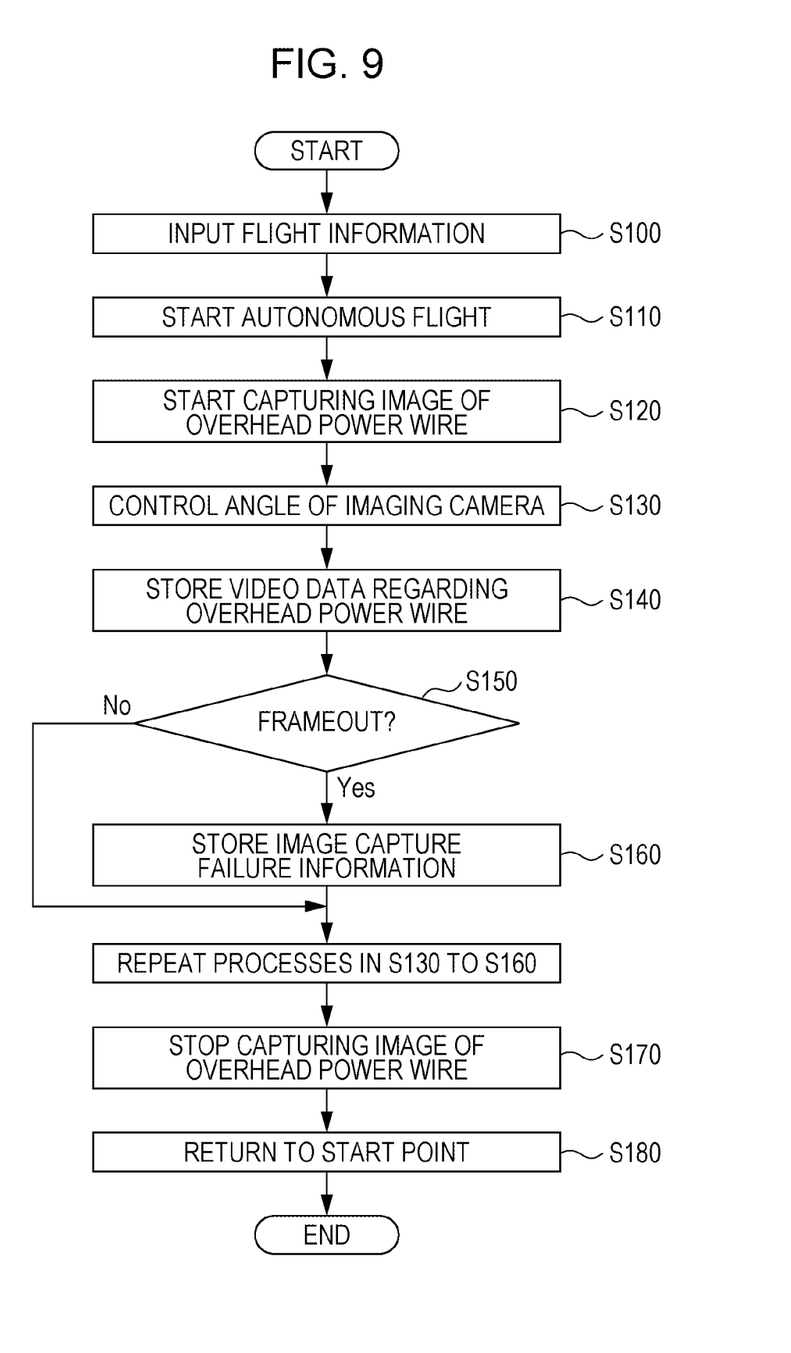
FIG. 9 is a flowchart illustrating an operation for controlling image capture of an object to be inspected according to the embodiment of the present invention.

In FIG. 10, the processes in steps S100 to S160 illustrated in FIG. 9 are performed in the same manner. However, if the unmanned aerial vehicle 100 reaches the image capture end point for an object to be inspected in accordance with the flight route, the autonomous flight control program determines whether image capture failure information is stored (S200). If image capture failure information is stored, the autonomous flight control program starts autonomous flight of the unmanned aerial vehicle 100 to the image capture failure zone, which is included in the image capture failure information, and instructs the camera operation control module 230 to capture the images again. In response to the instruction, the camera operation control module 230 captures the images corresponding to the image capture failure zone again (S210), and the re-captured video data of the overhead power wire W is stored in the storage unit 170 by the video data storing module 260. When re-capture of the video data is completed, the camera operation control module 230 deactivates the imaging camera 140 (S220), and the unmanned aerial vehicle 100 returns to the start point in accordance with the flight route (S230).

As described above, according to the present embodiment, if the image capture operation of the overhead power wire W fails, an image capture operation of the overhead power wire W corresponding to the zone where an image capture operation previously failed is automatically performed again. In this manner, the efficiency of the inspection of the overhead power wire W can be further improved.

A third embodiment according to the present invention is described below. According to the third embodiment, if it is determined that frameout of the overhead power wire W has occurred during the image capture period, the autonomous flight control program stops capturing the image of the overhead power wire W and causes the unmanned aerial vehicle 100 to return to the start point. The occurrence of frameout means that the image capturing environment is not good enough. Consequently, even when the image of an overhead power wire is continuously captured under the inappropriate image capturing environment, frameout may still occur. In such a case, the image capture operation is stopped, and an image capture operation is performed at another date and time. As a result, the work efficiency can be improved.

For this reason, according to the third embodiment, if frameout occurs one or more times, the image capturing environment is considered as an inappropriate environment. Thus, an unmanned aerial vehicle is returned to the start point to stop the image capture operation. Thereafter, at another date and time, the operation to capture the image of the overhead power wire W is started again at the image capture failure point recorded in the image capture failure information.

According to the above-described embodiment, for ease of description, an example has been described in which the image capturing direction of the imaging camera 140 is adjusted in the short direction of the video frame F, as illustrated in FIGS. 7A and 7B. In reality, if the flight direction of the unmanned aerial vehicle is not parallel to the direction of the overhead power wire W, the image capturing direction of the imaging camera 140 can be further adjusted in the long direction of the video frame F. That is, the angle adjustable actuator can adjust the angle of the imaging camera 140 with two degrees of freedom in the short and long directions of the video frame F. In this case, it may be determined whether frameout occurs in each of the short direction and the long direction of the video frame F.

Furthermore, while the above embodiments have been described with reference to the overhead power wire serving as an object to be inspected, the overhead power wire is merely an example. The present invention is applicable to inspection of high-rise buildings and natural disaster areas, in addition to inspection of overhead power wires. Still furthermore, while the present embodiment has been described with reference to the example in which the imaging camera is attached to the airframe main body via the angle adjustable actuator, the angle adjustable actuator is not necessarily needed if the imaging camera itself has an electronic or optical angle adjusting function of adjusting the angle of the image capturing direction.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. An unmanned aerial vehicle comprising:
   an image capturing unit configured to capture an image of an object;
   a detection unit configured to detect a relative position of the object;
   an angle control unit configured to control an angle of an image capturing direction of the image capturing unit on a basis of the relative position detected by the detection unit;
   a determination unit configured to determine whether the object is moved out of an image capturing range of the image capturing unit during an image capture operation performed by the image capturing unit; and
   a storage unit configured to store image capture failure information including the result of determination if the determination unit determines that the object is moved out of the image capturing range;

wherein the image capture failure information is different than video data captured by the image capturing unit and indicates the object is moved out of the image capturing range; and wherein the determination unit determines whether the object is moved out of the image capturing range on a basis of the image capturing direction of the image capturing unit and the relative position detected by the detection unit.

2. The unmanned aerial vehicle according to claim 1, wherein the image capturing direction of the image capturing unit is determined by an angle of view of an imaging camera of the image capturing unit and the angle controlled by the angle control unit.

3. The unmanned aerial vehicle according to claim 1, wherein the determination unit determines whether the object is out of the image capturing range for a predetermined period of time or longer.

4. The unmanned aerial vehicle according to claim 1, wherein if the image capturing unit generates n video frames per second, the determination unit determines whether the image of the object is moved out of m or more video frames, where m is a natural number less than n.

5. The unmanned aerial vehicle according to claim 4, wherein the determination unit determines whether the image of the object is moved out of a predetermined area of a video frame.

6. The unmanned aerial vehicle according to claim 1, further comprising:
a flight control unit configured to control the flight of the unmanned aerial vehicle such that the unmanned aerial vehicle follows the object on a basis of the relative position detected by the detection unit.

7. The unmanned aerial vehicle according to claim 1, further comprising:
an output unit configured to output the image capture failure information stored in the storage unit.

8. The unmanned aerial vehicle according to claim 6, wherein if the image capture failure information is stored, the flight control unit controls the flight such that the image of the object is re-captured on a basis of the image capture failure information.

9. The unmanned aerial vehicle according to claim 6, wherein if the image capture failure information is stored, the flight control unit stops the flight.

10. The unmanned aerial vehicle according to claim 1, wherein the detection unit emits a laser beam to the object and measures a reflected beam so as to measure a distance and an angle to the object.

11. A method for inspecting an object by use of an unmanned aerial vehicle, the unmanned aerial vehicle including an imaging camera and a sensor that detects a relative position of the object, the method comprising:
the step of determining whether the imaging camera captures the image of the object from the relative position of the object detected by the sensor and an angle of view of the imaging camera during image capture of the object by the imaging camera; and
the step of storing image capture failure information including the result of determination if it is determined that the imaging camera does not capture the image of the object;

wherein the image capture failure information is different than video data captured by the imaging camera and indicates the object is moved out of an image capturing range.

12. The method according to claim 11, further comprising:
the step of outputting the image capture failure information.

13. The method according to claim 11, further comprising:
the step of controlling the flight such that the image of the object at a location at which the image capture failed is re-captured on a basis of the image capture failure information.

14. The method according to claim 11, further comprising:
the step of stopping the flight if the image capture failure information is stored.

15. The method according to claim 11, wherein in the step of determining whether the imaging camera captures the image of the object, the unmanned aerial vehicle has an imaging camera angle adjustment mechanism mounted therein, and it is determined whether the imaging camera captures the image of the object on a basis of an angle adjusted by the angle adjustment mechanism, an angle of view of the imaging camera, and the relative position of the object detected by the sensor.

16. A non-transitory computer readable storage medium storing program code which, when executed by a processor of an unmanned aerial vehicle that inspects an object and that includes an imaging camera and a sensor for detecting a relative position of the object, causes the processor to perform:
the step of determining whether the imaging camera captures the image of the object from the relative position of the object detected by the sensor and an angle of view of the imaging camera during image capture of the object by the imaging camera; and
the step of storing image capture failure information including the result of determination if it is determined that the imaging camera does not capture the image of the object;
wherein the image capture failure information is different than video data captured by the imaging camera and indicates the object is moved out of an image capturing range.

17. The non-transitory computer readable storage medium according to claim 16, wherein the program code further causes the processor to perform the step of outputting the image capture failure information.

18. The non-transitory computer readable storage medium according to claim 16, wherein the program code further causes the processor to perform the step of controlling the flight such that the image of the object at a location at which the image capture failed is re-captured on a basis of the image capture failure information.

19. The non-transitory computer readable storage medium according to claim 16, wherein the program code further causes the processor to perform the step of stopping the flight if the image capture failure information is stored.

* * * * *